(12) United States Patent
Grobe, III

(10) Patent No.: US 7,258,906 B2
(45) Date of Patent: Aug. 21, 2007

(54) SURFACE TREATMENT OF FLUORINATED CONTACT LENS MATERIALS

(75) Inventor: George L. Grobe, III, Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 11/475,588

(22) Filed: Jun. 27, 2006

(65) Prior Publication Data

US 2006/0246250 A1 Nov. 2, 2006

Related U.S. Application Data

(62) Division of application No. 10/864,615, filed on Jun. 9, 2004, now Pat. No. 7,094,458, which is a division of application No. 10/353,140, filed on Jan. 28, 2003, now Pat. No. 6,794,456, which is a division of application No. 09/219,500, filed on Dec. 21, 1998, now Pat. No. 6,550,915.

(51) Int. Cl.
*B32B 3/02* (2006.01)

(52) U.S. Cl. .................. 428/64.1; 428/421; 525/199; 525/200

(58) Field of Classification Search ............. 428/64.1, 428/421; 525/199, 200
See application file for complete search history.

(56) References Cited

U.S. PATENT DOCUMENTS 4,096,315 A 6/1978 Kubacki
4,217,038 A 8/1980 Letter et al.
4,312,575 A 1/1982 Peyman et al.
4,565,083 A 1/1986 Thompson
4,631,435 A 12/1986 McCarty
4,946,903 A 8/1990 Gardella, Jr. et al.
5,034,265 A 7/1991 Hoffman et al.
5,091,204 A 2/1992 Ratner et al.
5,153,072 A 10/1992 Ratner et al.
5,266,309 A 11/1993 Gardella, Jr. et al.
5,321,108 A 6/1994 Kunzler et al.
5,627,079 A 5/1997 Gardella, Jr. et al.
5,696,207 A 12/1997 Vargo et al.
5,945,486 A 8/1999 Vargo et al.

FOREIGN PATENT DOCUMENTS

EP 0 106 046 4/1984
EP 0 443 986 A 8/1991
EP 0 123 456 A2 1/2000
WO WO94 26811 A 11/1994
WO WO95 04609 2/1995

OTHER PUBLICATIONS

Grobe, et al. A Silicone Soft Contact Lens Surface Rearrangement et al. Surfaces in Biomaterials Symposium 1996.
Grobe, et al. Electrical and Optical Polymer Systems et al. World Scientific Pub. Co. Pte. Ltd London England 1997.
Clark, et al. J. Poly. Sci., Part A, vol. 25, pp. 2643-2664 (1987).

*Primary Examiner*—Bernard Lipman
(74) *Attorney, Agent, or Firm*—Glenn D. Smith

(57) ABSTRACT

Hydrogen-plasma modification of fluorinated polymers reduces the surface chemistry of this polymer removing fluorine, leaving behind a carbon-enriched surface that is further plasma processed into a hydrophilic surface for a lens material to be inserted into the ocular environment.

1 Claim, No Drawings

US 7,258,906 B2

SURFACE TREATMENT OF FLUORINATED CONTACT LENS MATERIALS

RELATED APPLICATION INFORMATION

This application is a divisional application of Ser. No. 10/864,615 filed Jun. 9, 2004 now U.S. Pat No. 7,094,458, which is a divisional application of Ser. No. 10/353,140 filed Jan. 28, 2003 now U.S. Pat. No. 6,794,456, which is a divisional application of Ser. No. 09/219,500 filed Dec. 21, 1998 now U.S. Pat. No. 6,550,915.

FIELD OF THE INVENTION

The present invention relates to a method for surface treating a fluorinated contact lens, including the treatment of highly fluorinated or fluorosilicon contact-lens materials. The process comprises treating the lens with a hydrogen-containing plasma to reduce the fluorine content of the surface layer, followed by oxidation of the surface to increase its oxygen and/or nitrogen content, thereby improving its wettability.

BACKGROUND TO THE INVENTION

Contact lenses made from highly fluorinated materials have been investigated for a number of years. Such materials can generally be subdivided into two major classes, namely hydrogels and non-hydrogels. Non-hydrogels do not absorb appreciable amounts of water, whereas hydrogels can absorb and retain water in an equilibrium state. Regardless of their water content, both non-hydrogel and hydrogel fluorinated contact lenses tend to have relatively hydrophobic, non-wettable surfaces.

The art has recognized that introducing fluorine-containing groups into contact lens polymers can significantly increase oxygen permeability. For example, U.S. Pat. No. 4,996,275 to Ellis et al. discloses using a mixture of comonomers including the fluorinated compound bis(1,1,1,3,3,3-hexafluoro-2-propyl)itaconate in combination with organosiloxane components. The fluorination of certain monomers used in the formation of silicone hydrogels has been indicated to reduce the accumulation of deposits on contact lenses made therefrom, as described in U.S. Pat. Nos. 4,954,587, 5,079,319 and 5,010,141. Moreover, the use of silicone-containing monomers having certain fluorinated side groups, i.e. —$(CF_2)$—H, have been found to improve compatibility between the hydrophilic and silicone-containing monomeric units, as described in U.S. Pat. Nos. 5,387,662 and 5,321,108 to Kunzler et al. Other fluorinated contact lens materials have been disclosed, for example, in U.S. Pat. No. 3,389,012; U.S. Pat. No. 3,962,279; and U.S. Pat. No. 4,818,801.

Those skilled in the art have recognized the need for modifying the surface of fluorinated contact lenses so that they are compatible with the eye. It is known that increased hydrophilicity of the contact lens surface improves the wettability of the contact lenses. This in turn is associated with improved wear comfort of the contact lens. Additionally, the surface of the lens can affect the lens's susceptibility to deposition, particularly the deposition of proteins and lipids from the tear fluid during lens wear. Accumulated deposition can cause eye discomfort or even inflammation. In the case of extended wear lenses, the surface is especially important, since extended wear lens must be designed for high standards of comfort over an extended period of time, without requiring daily removal of the lens before sleep. Thus, the regimen for the use of extended wear lenses would not provide a daily period of time for the eye to recover from any discomfort or other possible adverse effects of lens wear.

Contact lenses have been subjected to plasma surface treatment to improve their surface properties, with the intent to render their surfaces more hydrophilic, deposit resistant, scratch resistant, or otherwise modified. For example, plasma treatment to effect better adherence of a subsequent coating is generally known. U.S. Pat. No. 4,217,038 to Letter discloses, prior to coating a silicone lens with sputtered silica glass, etching the surface of the lens with an oxygen plasma to improve the adherence of a subsequent coating. U.S. Pat. No. 4,096,315 to Kubacki discloses a three-step method for coating plastic substrates such as lenses, preferably PMMA (polymethylmethacrylate) lenses. The method comprises plasma treating the substrate to form hydroxyl groups on the substrate in order to allow for good adherence, followed by a second plasma treatment to form a silicon-containing coating on the substrate, and followed finally by a third plasma treatment with inert gas, air, oxygen, or nitrogen. Kubacki states that pretreatment with hydrogen, oxygen, air or water vapor, the latter preferred, forms hydroxy groups. Neither Letter nor Kubacki mentions the surface treatment of highly fluorinated or fluorosilicone contact lens materials.

U.S. Pat. No. 4,312,575 to Peyman teaches the use of hydrogen/fluorocarbon gaseous mixtures to treat silicone lenses. In Example 2 of Peyman, polydimethylsiloxane lenses are initially treated with a 50% hydrogen/50% tetrafluoroethylene mixture, followed by an oxygen plasma treatment. Peyman states that when it is desired to utilize a halogenated hydrocarbon to perform the plasma polymerization process of the present invention, hydrogen gas may be added to the halogenated hydrocarbon in order to accelerate the polymerization reaction. Peyman states that hydrogen may be added to the plasma polymerization apparatus in an amount ranging from about 0.1 to about 5.0 volumes of hydrogen per volume of the halogenated hydrocarbon. Peyman does not mention how to surface treat highly fluorinated contact lens materials.

U.S. Pat. No. 4,631,435 to Yanighara et al. discloses a plasma polymerization process employing a gas containing at least one compound selected from halogenated alkanes, alkanes, hydrogen and halogens in specific combinations, the atomic ratio of halogen/hydrogen in the aforesaid gas being 0.1 to 5 and the electron temperature of the plasma in the reaction zone being 6,000° K. or higher and lower than 30,000° K. The resulting coating is, in particular, suitable as the protective film for magnetic recording media.

U.S. Pat. Nos. 5,153,072; 5,091,204; 5,034,265; and 4,565,083 to Ratner disclose a method of treating articles to improve their biocompatibility according to which a substrate material is positioned within a reactor vessel and exposed to plasma gas discharge in the presence of an atmosphere of an inert gas such as argon and then in the presence of an organic gas such as a halocarbon or halohydrocarbon gas capable of forming a thin, biocompatible surface covalently bonded to the surface of the substrate. The method is particularly useful for the treatment of vascular graft materials. The graft material is subjected to plasma gas discharge at 5-100 watts energy. Ratner does not discuss the surface treatment of highly fluorinated contact-lens materials.

In view of the above, it would be desirable to provide a highly fluorinated contact lens with an optically clear, hydrophilic surface film that will exhibit improved wettability. It would be further desirable to be able to surface treat a fluorinated hydrogel or RGP contact lens that would allow its use in the human eye for an extended period of time. In particular, it would be desirable to provide a high-Dk fluorinated ophthalmic lens capable of extended wear for continous periods of at least 24 hours and, more preferably, to provide a biocompatible lens capable of continous and comfortable wear for 3 to 30 days without unacceptable corneal swelling or other adverse effects.

SUMMARY OF THE INVENTION

The invention relates to a method of treating a highly fluorinated or fluorosilicone contact lens comprising the following steps:
(a) treating the lens with a hydrogen-containing plasma to reduce the fluorine content of the the lens; and
(b) plasma treating the polymer surface with an oxidizing gas to increase its oxygen or nitrogen content and to improve its wettability.

DETAILED DESCRIPTION OF INVENTION

As indicated above, the present invention is directed to the surface treatment of a fluorinated contact lens material, either a fluorinated silicone material or non-silicone material that is highly fluorinated. The hydrogen plasma treatment of a fluorine-containing material has been found to cause the loss of fluorination over a surface depth of approximately 90 ångstroms into the material. The hydrogen (being present in excess) is also believed to fill radical sites on the polymer surface allowing the chemical reduction of the polymer. Without wishing to be bound by theory, since the plasma gas-phase reactions on the surface of a material are complex, it is believed that the hydrogen reacts with fluorine at the surface of the lens, forming HF which can be carried off by a vacuum pump during the process. Thus, the invention utilizes hydrogen-gas plasmas to reduce fluorinated surface chemistries. At the same time, the carbon content (as measured by XPS analysis) tends to increase, allowing improved oxidation in a subsequent plasma oxidation step.

In the case of fluorosilicone materials, the HF formed in the gas phase can be utilized to attack the silicone backbone of the polymer. The fluorine chemically reacts with the silicon atoms in the film forming $SiF_x$ species. When the silicon has four fluorine atoms ($SiF_4$) the molecule can be pumped off by the vacuum, causing the loss of silicon from the film. At the same time, the large excess in hydrogen molecules causes the addition of hydrogen to the remaining chemistry, the hydrogen further reducing the surface of the lens material. The hydrogen-reduced surface of the lens can then be further modified by the use of subsequent oxidizing plasmas.

The process conditions of the present invention may be substantially the same as those in conventional plasma polymerization. The degree of vacuum during plasma polymerization may be $1 \times 10^3$ to 1 torr and the flow rate of the gas flowing into the reactor may be, for example, 0.1 to 100 cc (STP)/min in the case of the reactor having an inner volume of about 100 liter. The above-mentioned hydrogen gas may be mixed with an inert gas such as argon, helium, xenon, neon and the like before or after being charged into the reactor. The addition of halogenated alkanes is unnecessary but not deleterious, and may be present in combination with the hydrogen, preferably at a ratio of less than 0.1 to 5 of gaseous halogen to hydrogen. The substrate temperature during plasma polymerization is not particularly limited, but is preferably between 0° and 300° C.

The type of discharge to be used for the generation of plasma is not particularly limited and may involve the use of DC discharge, low frequency discharge, high frequency discharge, corona discharge or microwave discharge. Also, the reaction device to be used for the plasma polymerization is not particularly limited. Therefore either an internal electrode system or an electrodeless system may be utilized. There is also no limitation with respect to the shape of the electrodes or coil, or to the structure or the cavity or antenna in the case of microwave discharge. Any of the known devices for plasma polymerization can be utilized.

Preferably, the plasma is produced by passing an electrical discharge, usually at radio frequency, through a gas at low pressure (0.005-5.0 Torr). Accordingly, the applied radio frequency power is absorbed by atoms and molecules in the gaseous state, and a circulating electrical field causes these excited atoms and molecules to collide with one another as well as the walls of the chamber and the surface of the material being treated. Electrical discharges produce ultraviolet (WV) radiation, in addition to energetic electrons and ions, atoms (ground and excited states), molecules and radicals. Thus, a plasma is a complex mixture of atoms and molecules in both ground and excited states which reach a steady state after the discharge is begun.

The effects of changing pressure and discharge power on the plasma treatment is generally known to the skilled artisan. The rate generally decreases as the pressure is increased. Thus, as pressure increases the value of E/P, the ratio of the electric field strength sustaining the plasma to the gas pressure, decreases and causes a decrease in the average electron energy. The decrease in electron energy in turn causes a reduction in the rate coefficient of all electron-molecule collision processes. A further consequence of an increase in pressure is a decrease in electron density. Taken together, the effect of an increase in pressure is to cause the rate coefficient to decrease. Providing that the pressure is held constant there should be a linear relationship between electron density and power. Thus the rate coefficient should increase linearly with power.

Hydrogen plasmas have previously been shown to reduce fluorination by attacking C—F bonds forming C—H bonds. In the present invention, the surface chemistry of the fluorinated material is reduced to allow for subsequent oxidation. Such a preliminary reduction was found necessary, because otherwise simple plasma oxidations resulted in delamination of the oxidized surface on fluorinated polymers. While investigating the dynamics of the hydrogen plasma with the fluorinated substrate, it was further discovered that the silicone backbone in fluorosilicone materials could be removed by action of the plasma. As mentioned above, it is believed that the hydrogen gas forms HF gas which attacks the silicone backbone, and this is believed to convert most of the polymer backbone at the surface to aliphatic carbon species, thus tending to increase the carbon content of the surface. The carbon formed contains a fair amount of stereoregularity, and this carbon structure has lattice vibrations similar to graphite, although some unsaturation was also detected. A substantial part of the original C—F bonding can be removed by the hydrogen plasma modification.

The surface of the hydrogen plasma-treated fluorinated material is further treated to increase its wettability, preferably by plasma oxidation with an oxygen or nitrogen-containing plasma. For example, the hydrogen-plasma reducted surface can be oxidized by means of a plasma gas. Such an oxidation of the lens may be accomplished in atmosphere composed of an oxidizing media such as oxygen or nitrogen containing compounds: ammonia, air, water, peroxide, $O_2$ (oxygen gas), methanol, acetone, alkylamines, etc. or combinations thereof.

The invention is applicable to a wide variety of highly fluorinated contact lens materials. By the term highly fluorinated is meant at least five percent, preferably at least about 10 percent of a fluorine content in the top 90 angstroms of the surface, as measured by XPS analysis. The determination of the depth of the analysis is based on the following equation:

$h\nu = KE$ – binding energy of the element in question.

wherein $h\nu = 1486.6$, KE is the kinetic energy of the source (e.g., the x-ray energy of the Al anode) used in the XPS analysis. The binding energy of the element varies. For example, the binding energy of carbon is 285 eV and the binding energy of fluorine is 686 eV. Furthermore, $(KE)^{1/2} = \lambda$ $d = 3\lambda \sin \theta$ wherein $\theta$ is the angle of the XPS measurement (e.g. 45°), d is the depth of the measurement (approximately 90 angstroms, as in the examples below), and the 3 corresponds to a 95% signal.

Highly fluorinated materials include hydrogels (fluorogels) and non-hydrogels. In general, hydrogels are a well known class of materials which comprise hydrated, crosslinked polymeric systems containing water in an equilibrium state. Non-hydrogels include elastomers and no-water or low water xerogels.

Fluorosilicone hydrogels generally have a water content greater than about 5 weight percent and more commonly between about 10 to about 80 weight percent. Such materials are usually prepared by polymerizing a mixture containing at least one fluorinate silicone-containing monomer and at least one hydrophilic monomer. Typically, either the fluorosilicone-containing monomer or the hydrophilic monomer functions as a crosslinking agent (a crosslinker being defined as a monomer having multiple polymerizable functionalities) or a separate crosslinker may be employed. Applicable fluorosilicone-containing monomeric units for use in the formation of contact lens hydrogels are well known in the art and numerous examples are provided in commonly assigned U.S. Pat. No. 5,321,108 to Kunzler et al. and U.S. Pat. No. 4,810,764, to Friends et al., which patents are hereby incorporated by reference in their entirety.

Another class of fluorinated materials that can be treated by the present invention are the high-Dk fluoropolymeric contact-lens rigid-gas-permeable contact lens-article made from a materials comprising perfluorinated monomers. An especially advantageous (High-Dk) material comprises an amorphous copolymer of perfluoro-2,2-dimethyl-1,3-dioxole with one or more copolymerizably acceptable ethylenically unsaturated fluorinated cmonomers, the proportion of perfluor-2,2-dimethyl-1-3-dioxole in the dipolymer being at least about 20 mole percent of the copolymer. The contact lens material may further comprise from 10 to 80 weight percent of one or more other comonomers selected from the group consisting of tetrafluoroethylene, hexafluoropropylene, chlorotrifluoroethylene (CTFE) vinylidene fluoride, PBVE, perfluoro(alkyl vinyl) ether (PAVE) having the formula $CF_2=CFO(CF_2CFXO) nR_f$ wherein X is F or $CF_3$ n is 0-5, and R is a perfluoroalkyl group of 1-6 carbon atoms, and mixtures thereof. Such monomers are disclosed in commonly assigned co-pending application Ser. No. 09/220,002 (Attorney Docket No. P02141) filed on even date herewith, the disclosure of which is hereby incorporated by reference in its entirety.

In one embodiment of the invention, a hydrogen-plasma treated fluorinated polymeric surface is subsequently oxidized by an oxidizing plasma, e.g., employing $O_2$ (oxygen gas), water, hydrogen peroxide, air, ammonia, etc., or mixtures thereof, creating radicals and oxidized functional groups. Such oxidation renders the surface of a lens more hydrophilic and wettable. Optionally further surface treatment can be carried out, for example, the attachment of hydrophilic polymers or macromonomers as disclosed in the prior art.

In practice, contact lenses may be surface treated by placing them, in their unhydrated state, within an electric glow discharge reaction vessel (e.g., a vacuum chamber). Such reaction vessels are commercial available. The lenses may be supported within the vessel on an aluminum tray (which acts as an electrode) or with other support devices designed to adjust the position of the lenses. The use of a specialized support devices which permit the surface treatment of both sides of a lens are known in the art and may be used in the present invention.

The gas employed in the plasma treatment comprises the gaseous treatment media or atmosphere, such as hydrogen or hydrogen in an inert gas such as argon, at a electric discharge frequency of, for example, 13.56 MHz, suitably between about 100-1000 watts, preferably 200 to 800 watts, more preferably 300 to 500 watts, at a pressure of about 0.1-1.0 Torr. The plasma treatment time is preferably at least 2 minutes total, preferably at least 5 minutes total. Optionally, the lens may be flipped over to better treat both sides of the lens. The plasmatreatment gas is suitably provided at a flow rate of 50 to 500 sccm, more preferably 100 to 300 sccm. The thickness of the surface treatment is sensitive to plasma flow rate and chamber temperature, as well be understood by the skilled artisan. Since the coating is dependent on a number of variables, the optimal variables for obtaining the desired or optimal coating may require some adjustment. If one parameter is adjusted, a compensatory adjustment of one or more other parameters may be appropriate, so that some routine trial and error experiments and iterations thereof may be necessary in order to achieved the coating according to the present invention. However, such adjustment of process parameters, in light of the present disclosure and the state of the art in plasma treatment, should not involve undue experimentation. As indicated above, general relationships among process parameters are known by the skilled artisan, and the art of plasma treatment has become well developed in recent years. The Examples below provide the Applicants' best mode for forming the coating on fluorinated lenses. The contact lens of the present invention are especially advantageous for extended wear or specialty uses, such as for relatively thick lenses. Extended lenses are lenses capable of being worn overnight, preferably capable of being worn for at least one week, most preferably capable of wear for a continuous period of one week to one month. By "capable" is meant lenses approved by one or more governmental regulatory authorities for such consumer use, for example, the U.S. Food & Drug Administration (USFDA) in the US or its equivalent in other countries. Such polymers suitably have an oxygen permeability (Dk) that is suitably 80 to 1200 Barrers, preferably 100 to 500 Barrers. The oxygen-permeability Dk of a lens material does not depend on lens thickness. The oxygen-permeability is the rate at which oxygen will pass through a material. A Barrer is defined as:

$((cm^3 \text{ oxygen})(mm)/(cm^2)(sec)(mm \text{ Hg})) \times 10^{-10}$ or, alternatively, $((cm^3 \text{ oxygen})(cm)/(cm^2)(sec)(mm \text{ Hg})) \times 10^{-11}$ The oxygen transmissibility of a lens, as used herein, is the rate at which oxygen will pass through a specific lens. Oxygen transmissibility, Dk/t, is conventionally expressed in units of Barrers/mm, where t is the average thickness of the material (in units of mm) over the area being measured. For example, a lens having a Dk of 90 Barrers (oxygen-permeability barrers) and a thickness of 90 microns (0.090 mm) would have a Dk/t or 100 Barrers/mm (oxygen transmissibility Barrers/mm).

The Examples which follow are illustrative of specific embodiments of the invention, and various uses thereof. They set forth for explanatory purposes only, and are not to be taken as limiting the invention.

EXAMPLE 1

This example illustrates the surface chemical effects of treating a fluorogel material according to the present invention with a hydrogen plasma. The fluorogel material is made according to U.S. Pat. No. 5,321,108 to Kunzler et al., in particular the 40/10/10/10 mixture of 25 mol % octafluorosilicone/TRIS/DMA/NVP in Table 3 of the patent. As shown by the following series of experiments, the net effect of a hydrogen plasma can be oxidizing or reducing, depending on the conditions utilized in the processing window. By choosing the conditions for a reducing plasma, a surface can be created that allows for the addition of ammonia to create net increases in —$NH_2$ functionality (+15%) at the surface with associated reductions in —$CF_2$. The amount of $NH_2$ on the surface was reduced by extraction and autoclaving after plasma treatment (+7.5%). However, substantial amounts of the treatment remain after full processing.

The analysis of the fluorogel material begins with the examination of the unmodified matrix (control). Table 1 below contains the XPS data for the hydrogen plasma modification of fluorogels. This data reflects the atomic composition over the top 74 Angstroms (relative to carbon 1s electrons). The percentages reflect all elements except hydrogen, helium, and free lithium. As indicated in Table 1, the low resolution survey spectra of the control (Sample 1) polymer contained peaks for fluorine (10%), oxygen (14%), nitrogen (1%), carbon (67%) and silicon (7%). The material composition was consistent with respect to itself. The initial plasma modifications of this material with hydrogen attempted to remove fluorine and chemically reduce the rest of the matrix. The idea was to reduce chemical sites on the surface for future oxidation by ammonia. The method chosen to accomplish this was to start with mild plasma excitation conditions and move towards more aggressive plasma environments (varying pressure and wattage). Initially a 50 watt, 0.5 torr, 10 minute plasma was performed in a hydrogen environment. This plasma resulted in the reduction of the fluorine content (Sample 2 in Table 1). The reduction in fluorine was accompanied by a slight increase in oxygen and silicon. The increased silicon and oxygen concentrations were the result of a slight oxidation of the silicone to a silicate. The next set of plasma conditions increase the strength of the field: 100 Watt, 0.5 torr for 5 minutes (Sample 3 in Table 1). The reduction in time was an attempt to create approximately the same treatment at more aggressive wattage conditions and to examine the net effect on oxidation. The result was surprising in that the fluorine content decreased while the silicon and oxygen levels remained constant. Thus, the carbon content increased from the removal of the fluorine (initially 10% and 4.5% after this plasma). Increasing the time to 10 minutes (for 100 watt, 0.5 torr) resulted in increased oxidation of the substrate that increased the amount of oxygen and silicon. Further wattage and pressure increases resulted in the further oxidation of the substrate while also reducing the effectiveness of the defluorination process. This can be seen in Table 1, where the pressure increases to 1.0 Torr and wattage increases to 300 and 500 watts were examined. These experiments were all performed at ten minutes to have a basis of comparison. Due to the increases in the oxidation of the matrix by increased wattage plasma, it was determined that the 100 watt, 5 minute, 0.5 torr would represent the best reduction of surface chemistry for subsequent oxidation.

The next series of experiments examined the effects of the two-stage plasma treatment. Table 2 below contains the XPS data for the hydrogen and ammonia plasma modification of the fluorogel material. The data in the Table reflects the atomic composition (by XPS analysis) over the top 74 ångstroms (relative to carbon 1s electrons). As shown in Table 2, the initial reduction plasma made use of the 50 watt, 5 minute, 0.5 torr hydrogen-gas plasma discussed above. The chemically-reduced fluorogel surface was then subsequently exposed to an oxidizing plasma of ammonia. The most successful plasmas were composed of low wattage and pressure at extended periods of time, and therefore the experimental plasma conditions consisted of 100 watts, 0.5 torr, for a period of 15 minutes. As shown in Table 2 below, this plasma resulted in the incorporation of 15% nitrogen into the reduced fluorogel polymer in the form of an amine. This plasma also increased the amount of fluorine present while reducing the overall carbon levels. The plasma-oxidized product was then sent to processing and autoclave sterilization. As indicated in Table 2, the net effect of the extraction and the autoclaving was the reduction in the net nitrogen by 50% (7.5%). In addition, increases in the amount of oxygen present were also found. The oxygen concentration increases were believed to be from the hydrolysis of the Si—F bounds formed in the second part of the plasma. The resulting fully-processed fluorogel polymer exhibited a 35 degree water contact angle while dry.

TABLE 1

| Sample | Process Description | | Oxygen | Carbon | Fluorine | Nitrogen | Silicon | N/C | O/C |
|---|---|---|---|---|---|---|---|---|---|
| 1 | Control | Average | 14.4 | 67.1 | 10.2 | 1.4 | 6.9 | 0.02 | 0.21 |
|   |   | STDEV | 1.1 | 0.9 | 0.3 | 0.2 | 0.1 | 0.0 | 0.0 |
| 2 | $H_2$/50 Watts/ 10 Min/0.5 Torr | Average | 18.6 | 65.6 | 5.1 | 1.2 | 9.9 | 0.0 | 0.3 |
|   |   | STDEV | 0.9 | 1.1 | 0.2 | 0.3 | 0.2 | 0.0 | 0.0 |
| 3 | $H_2$/100 Watts/ 5 Min/0.5 Torr | Average | 15.6 | 71.6 | 4.5 | 0.9 | 7.3 | 0.0 | 0.2 |
|   |   | STDEV | 3.2 | 5.3 | 0.2 | 0.6 | 1.8 | 0.0 | 0.1 |

TABLE 1-continued

| Sample | Process Description | | Oxygen | Carbon | Fluorine | Nitrogen | Silicon | N/C | O/C |
|---|---|---|---|---|---|---|---|---|---|
| 4 | $H_2$/100 Watts/ 10 Min/0.5 Torr | Average | 16.6 | 69.9 | 5.0 | 1.2 | 7.7 | 0.0 | 0.2 |
| | | STDEV | 0.6 | 2.4 | 1.0 | 1.2 | 0.2 | 0.0 | 0.0 |
| 5 | $H_2$/300 Watts/ 10 Min/0.5 Torr | Average | 13.8 | 71.9 | 6.8 | 4.7 | 2.8 | 0.1 | 0.2 |
| | | STDEV | 0.3 | 1.9 | 0.4 | 0.8 | 0.4 | 0.0 | 0.0 |
| 6 | $H_2$/500 Watts/ 10 Min/0.5 Torr | Average | 15.7 | 64.1 | 11.6 | 4.4 | 4.2 | 0.1 | 0.2 |
| | | STDEV | 0.5 | 0.1 | 0.7 | 0.2 | 0.1 | 0.0 | 0.0 |
| 7 | $H_2$/500 Watts/ 10 Min/1 Torr | Average | 30.8 | 46.6 | 8.2 | 1.9 | 12.5 | 0.0 | 0.7 |
| | | STDEV | 1.0 | 1.8 | 0.1 | 0.1 | 0.8 | 0.0 | 0.0 |
| 8 | $H_2$/500 Watts/10 Min/ 0.25 Torr | Average | 25.5 | 47.1 | 9.8 | 1.9 | 15.6 | 0.0 | 0.5 |
| | | STDEV | 0.4 | 1.6 | 0.4 | 0.3 | 0.6 | 0.0 | 0.0 |

TABLE 2

| Sample | Process Description | | Oxygen | Carbon | Fluorine | Nitrogen | Silicon | N/C | O/C |
|---|---|---|---|---|---|---|---|---|---|
| 9 | Control | Average | 14.40 | 67.10 | 10.20 | 1.40 | 6.90 | 0.0 | 0.2 |
| | | STDEV | 1.1 | 0.9 | 0.3 | 0.2 | 0.1 | 0.0 | 0.0 |
| 10 | $H_2$/100 Watts/ 5 Min/0.5 Torr $NH_3$/100 Watts/15 Min/ 0.5 Torr | Average | 15.6 | 48.3 | 14.2 | 15.8 | 6.2 | 0.3 | 0.3 |
| | | STDEV | 0.9 | 0.9 | 0.6 | 0.5 | 0.7 | 0.0 | 0.0 |
| 11 | $H_2$/100 Watts/ 5 Min/0.5 Torr $NH_3$/100 Watts/15 Min/ 1.0 Torr | Average | 26.3 | 52.8 | 3.3 | 7.9 | 9.7 | 0.2 | 0.5 |
| | | STDEV | 0.3 | 2.3 | 1.2 | 0.7 | 0.8 | 0.0 | 0.0 |
| 12 | Same as Sample 11 but also with alcohol extraction and autoclavving | Average | 20.7 | 55.3 | 9.3 | 7.5 | 7.2 | 0.1 | 0.4 |
| | | STDEV | 2.3 | 5.4 | 1.2 | 0.3 | 2.1 | 0.0 | 0.1 |

EXAMPLE 2

The example illustrates the plasma treatment of another fluorinated contact-lens material according to the present invention. The material in this case was a fluoroxerogel. A xerogel is a material that contains less than two percent water. The fluorogel comprised the reaction product of methacrylate end capped DP100 poly(65mole %)methyl trifluoropropyl(35mole %) dimethyl siloxane; octafluoropentyl methacrylate; and 3-methacryloxy propyl-1-propyloxyoctafluoro pentyl tetramethyl disiloxane.

A hydrogen-containing plasma was employed to reduce the fluorinated surface, after which it was oxidized. The first step was to examine the conditions necessary to maximize the reduction in the surface. The following experiments start at low wattage in an attempt to find the best E/P and then move up and through the energetically acceptable region. These initial tests utilized XPS to examine the surface chemistry of the films after modification.

Sample specimens were in the form of films which were extracted in toluene overnight and dried in a vacuum oven. The films were placed in plastic bags. The plasma chamber was a direct current DC Radio Frequency Glow Discharge (RFGD) chamber manufactured by (Branson Model 4155). This chamber is a cold equilibrium planar configuration with a discharge at 13.56 MHz that has a maximum power of 500 watts. All samples were pre-pumped to 0.01 torr prior to any introduction of working gas. All working gases were allowed to equilibrate for a period of 2 to 5 minutes including between subsequent steps. The X-ray Photoelectron Spectrometer (XPS) utilized in this study was a Physical Electronics [PHI] Model 5600. This instrument utilized an aluminum anode operated at 300 watts, 15 kV and 27 milliamps. The excitation source was monochromatized utilizing a torodial lens system. The 7 mm filament was utilized for the polymer analysis due to the reduced sample damage and ease of photoionization neutralization. The base pressure of this instrument was $2.0 \times 10^{-10}$ Torr while the pressure during operation was $1.0 \times 10^{-9}$ Torr. This instrument made use of a hemispherical energy analyzer and included an Apollo workstation with PFH 8503A version 4.0A software. The practical measure of sampling depth for this instrument at a sampling angle of 45° and with respect to carbon was approximately 74 ångstroms. All elements were charge corrected to the $CH_x$ peak of carbon to a binding energy of 285.0 electron volts (eV).

Each of the specimens was analyzed utilizing a low resolution survey spectra [0-1100 eV] to identify the elements present on the sample surface. The high resolution spectra were performed on those elements detected from the low resolution scans. The elemental composition was determined from the high resolution spectra. The atomic composition was calculated from the areas under the photoelectron peaks after sensitizing those areas with the instrumental transmission function and atomic cross sections for the orbital of interest. Since XPS does not detect the presence of hydrogen or helium these elements will not be included in any calculation of atomic percentages.

The low resolution XPS survey spectra taken at a takeoff angle of 45 degrees for the untreated fluoroxerogel surfaces contained peaks for fluorine, carbon, oxygen and silicon. The carbon "1s" region was curve fit for the various carbon chemistries seen under the "1s" envelope. This procedure involved first fitting the carbon "1s" region with a peak for the $CH_x$ carbon at 285.0 eV. This peak was fit by matching the qualitative structure of low binding energy side of the carbon 1s peak which was exclusively due to $CH_x$ carbon (assuming no graphite, carbides or diamond structure). The full width at half maximum (FWHM) value was adjusted along with the percentage Gaussian-Lorentzian peak shape. The FWHM and Gaussian-Lorentzian values for the CHx peak were utilized for all other peak shapes fit for a particular carbon "1s" envelope. The envelope was then fit with peaks at 286.5 eV for C—O bonding, 288.0 eV for C=O bonding, 289.0 eV for O=C—O bonding, 289.5 eV for C—F bonding, 292 eV for C—$F_2$ bonding and 292.8 eV for C—$F_3$. The computer was utilized to vary position and FWHM by +0.1 eV and to vary the percentage Gaussian-Lorentzian by five percent. The computer attempts different fits by varying position, FWHM and Gaussian-Lorentzian shape while measuring the residual of the attempted fit. The resultant carbon chemistries fit into the envelope are summarized in Tables 3, 4, and 5 below, at respectively increasing depth measurements, along with the atomic concentration data, in an an attempt to understand the film behavior over the approximately first 100 ångstroms.

TABLE 3

(36 Angstroms at 20°)

| Specimen | Fluorine | Oxygen | Carbon | Silicon | CHx | C—Os | CFs |
|---|---|---|---|---|---|---|---|
| 1 | 24.18 | 15.04 | 46.29 | 13.61 | | | |
| 2 | 24.33 | 15.92 | 46.18 | 14.21 | | | |
| 3 | 24.39 | 15.29 | 47.54 | 14.31 | | | |
| 4 | 24.58 | 15.53 | 45.81 | 14.27 | | | |
| 5 | 23.13 | 15.88 | 47.15 | 12.38 | | | |
| Average | 24.1. | 15.5 | 46.6 | 13.8 | | | |
| STDEV | 0.6 | 0.4 | 0.7 | 0.8 | | | |

TABLE 4

(74 Angstroms at 45°)

| Specimen | Fluorine | Oxygen | Carbon | Silicon | CHx | C—Os | CFs |
|---|---|---|---|---|---|---|---|
| 1 | 28.19 | 14.46 | 47.65 | 9.70 | 58.36 | 25.25 | 18.49 |
| 2 | 28.46 | 14.22 | 47.19 | 10.42 | 63.64 | 18.71 | 17.65 |
| 3 | 28.08 | 15.27 | 45.98 | 10.67 | 64.69 | 19.60 | 15.71 |
| 4 | 27.42 | 14.97 | 46.46 | 11.14 | 65.04 | 19.23 | 15.73 |
| 5 | 28.59 | 13.87 | 48.14 | 9.39 | 59.28 | 22.45 | 18.26 |
| 6 | 27.75 | 14.35 | 47.48 | 10.42 | | | |
| 7 | 26.90 | 14.84 | 47.39 | 10.87 | | | |
| 8 | 26.57 | 14.49 | 47.73 | 11.22 | | | |
| 9 | 26.52 | 14.61 | 47.80 | 11.07 | | | |
| 10 | 27.97 | 14.71 | 47.66 | 9.66 | | | |
| Average | 27.6 | 14.6 | 47.3 | 10.5 | 62.2 | 21.0 | 17.2 |
| STDEV | 0.8 | 0.4 | 0.7 | 0.7 | 3.1 | 2.8 | 1.4 |

TABLE 5

(104 Angstroms at 80°)

| Specimen | Fluorine | Oxygen | Carbon | Silicon | CHx | C—Os | CFs |
|---|---|---|---|---|---|---|---|
| 1 | 30.50 | 14.34 | 46.52 | 8.64 | 46.05 | 30.07 | 23.89 |
| 2 | 30.61 | 14.58 | 45.91 | 8.90 | 52.10 | 25.77 | 22.13 |
| 3 | 29.64 | 15.54 | 46.25 | 9.56 | 52.65 | 25.12 | 22.13 |
| 4 | 29.91 | 14.98 | 45.29 | 9.82 | 49.46 | 27.26 | 23.29 |
| 5 | 30.44 | 14.59 | 45.29 | 8.16 | 47.88 | 28.85 | 22.27 |
| Average | 30.2 | 14.8 | 46.2 | 9.0 | 49.6 | 27.4 | 22.7 |
| STDEV | 0.4 | 0.5 | 0.6 | 0.7 | 2.8 | 2.1 | 0.8 |

The atomic concentration data for the angular resolved spectra would indicate that the fluorine decreases while the silicon increases as one probes deeper into the sample. The carbon and oxygen atomic concentrations do not appear to change significantly. Further, the carbon "1s" curve-fit data indicates that the carbon oxidation and fluorination appear to increase as one probes deeper into the sample. In addition, closer examination of the data revealed that the amount of $CF_3$ increase towards the surface while the $CF_2$ functionality increased towards the bulk of the sample. The angular dependent data indicated that the $CF_3$ (trifluoropropyl) group off the silicone chain appears to drive that portion of the material to the surface competitively over the $CF_2$ (octafluoropental methacrylate) portion of the polymer. This would account for the changes with the data with respect to depth.

For the hydrogen plasma treatment of the polymer films, initially mild conditions were chosen: 25 watts, 0.5 torr pressure of hydrogen, for five minutes on the dacron mesh tray. This plasma was not very effective. There was only minor variations in polymer chemistry after plasma treatment at 25 watts as shown in Table 6 below. The second step examined an increase in time to ten minutes while maintaining the pressure and wattage. This had little to no effect on the polymer surface as shown in Table 7 below. Thus, the wattage was increased to increase the hydrogen molecular energies while maintaining pressure and time, as noted earlier. The power was increased to 50 watts as indicated in Table 8. This had a dramatic effect on the polymer surface chemistry. The fluorine content of the surface dropped from around 28% to 6%. At the same time the oxygen content increased from approximately 15% to 27%, carbon content increased from 47 to 56% and the silicon content stayed about the same. It was most interesting to note the carbon "1s" curve fits revealed that the C—F bonding had decreased from 17% of the carbon envelope to 2.3%. This indicated that a majority of fluorine present in the film after plasma was in an ionic form and possibly HF and, therefore, should leave the polymer with processing.

TABLE 6

(74 Angstroms at 45°)

| Trial | Fluorine | Oxygen | Carbon | Silicon |
|---|---|---|---|---|
| 1 | 28.38 | 15.03 | 45.41 | 8.20 |
| 2 | 29.16 | 15.86 | 44.81 | 1017 |
| 3 | 26.50 | 15.12 | 48.49 | 11.18 |
| Average | 28.0 | 15.3 | 46.2 | 9.9 |
| STDEV | 1.4 | 0.5 | 2.0 | 1.5 |

TABLE 7

(74 Angstroms at 45° for 10 min. at 25 W)

| Trial | Fluorine | Oxygen | Carbon | Silicon |
|---|---|---|---|---|
| 4 | 30.41 | 14.81 | 46.58 | 8.20 |
| 5 | 34.08 | 15.51 | 43.68 | 7.11 |
| 6 | 28.90 | 15.12 | 43.11 | 12.48 |
| Average | 31.1 | 15.1 | 44.5 | 9.3 |
| STDEV | 2.7 | 0.4 | 1.9 | 2.8 |

TABLE 8

(at 45° for 10 min. at 50 W)

| Trial | Fluorine | Oxygen | Carbon | Silicon | CHx | C—Os | CFs |
|---|---|---|---|---|---|---|---|
| 7 | 6.51 | 28.33 | 52.86 | 12.30 | 86.87 | 10.79 | 2.33 |
| 8 | 7.02 | 27.85 | 53.13 | 12.00 | 85.90 | 11.91 | 2.20 |
| 9 | 4.22 | 23.18 | 62.91 | 9.70 | 87.90 | 9.76 | 2.34 |
| Average | 5.9 | 26.5 | 56.3 | 11.3 | 86.90 | 10.8 | 2.3 |
| STDEV | 1.5 | 2.8 | 5.7 | 1.4 | 1.0 | 1.1 | 0.1 |

Increasing the wattage further served to reduce the polymer chemistry to an even greater extent. However, the reduction in chemistry was not excluded to the fluorine chemistry alone anymore. In fact the hydrogen plasma appeared at higher wattages and time to reduce all chemistries present on the surface. This can be seen in the atomic concentration and carbon 1s curve fit data in Tables 9 to 11 below. The data for the 100 watt, 300 watt five minute and 300 watt 10 minute can be examined as a sequential trend. The fluorine atomic percentage stays around 6% while the C—F bonding fluctuates towards 0%. The oxygen, and silicon atomic percentage decrease (silicon from 11% to 5.2%). The silicon bonding energy was indicating $Na_2SiF_6$ at 104.2 eV. It may be that silicon was lost via the gas phase though the creation of $SiF_4$ (which should also be at 104.2 eV). This may account for some of the fluorine in the polymer not being present as C—F or F—H$^+$. In addition, the carbon "1s" envelope is approximately 90% CHx type of chemistry. It is believed that the reduction in these chemistries may be the result of the formation of HF. At certain energies, this complex appears to attack the base polymer leaving primarily carbon behind. In addition, the carbon "1s" spectra has a long flat asymmetric tail reminiscent of a plasmon loss feature. A plasmon in XPS spectra is a loss in energy to the lattice vibrations in highly structured carbon atoms like graphite, diamond-like carbon and diamond. Further reductions in the silicon content appear. By raising the average particle energy and interaction time of time it was possible to get silicon contents as low as 1.5% on average (from an initial of 11%). The carbon content of this treated surface increased to 84% on average (from an initial value of 47%).

TABLE 9

(at 45° for 10 min. at 100 W)

| Trial | Fluorine | Oxygen | Carbon | Silicon | CHx | C—Os | CFs |
|---|---|---|---|---|---|---|---|
| 10 | 6.41 | 23.03 | 61.63 | 8.94 | 76.36 | 22.52 | 1.14 |
| 11 | 6.15 | 24.79 | 59.18 | 9.88 | 87.80 | 10.80 | 1.31 |
| 12 | 8.58 | 24.14 | 59.19 | 8.09 | 87.61 | 10.49 | 1.90 |
| Average | 7.0 | 24.0 | 60.0 | 9.0 | 83.9 | 14.6 | 1.5 |
| STDEV | 1.3 | 0.9 | 1.4 | 0.9 | 6.6 | 6.9 | 0.4 |

TABLE 10

(at 45° for 5 min. at 300 W)

| Trial | Fluorine | Oxygen | Carbon | Silicon | CHx | C—Os | CFs |
|---|---|---|---|---|---|---|---|
| 13 | 5.31 | 21.44 | 64.49 | 8.77 | 93.48 | 6.52 | 0 |
| 14 | 5.37 | 19.62 | 66.79 | 8.22 | 87.97 | 12.03 | 0 |
| 15 | 0.00 | 20.43 | 66.15 | 7.60 | 84.32 | 15.33 | 0.38 |
| 16 | 5.11 | 18.11 | 69.55 | 7.23 | 88.9 | 10.07 | 1.03 |
| Average | 3.9 | 19.9 | 66.7 | 8.0 | 88.7 | 11.0 | 0.4 |
| STDEV | 2.6 | 1.4 | 2.1 | 0.7 | 3.8 | 3.7 | 0.5 |

TABLE 11

(at 45° for 10 min. at 300 W)

| Trial | Fluorine | Oxygen | Carbon | Silicon | CHx | C—Oxq | CFs |
|---|---|---|---|---|---|---|---|
| 17 | 6.77 | 18.80 | 68.40 | 6.03 | 88.04 | 10.76 | 1.2 |
| 18 | 5.96 | 15.03 | 74.67 | 4.34 | 86.63 | 11.59 | 1.78 |
| 19 | 6.12 | 17.12 | 71.68 | 5.27 | 87.86 | 10.73 | 1/4 |
| Average | 6.3 | 17.0 | 71.6 | 5.2 | 87.5 | 11.0 | 1.5 |
| STDEV | 0.4 | 1.9 | 3.1 | 0.8 | 0.8 | 0.5 | 0.3 |

EXAMPLE 3

This example illustrates the plasma treatment of a fluorinated contact-lens materials according to the present invention, in which following hydrogen-containing plasma to reduce fluorinated surface chemistries, the polymer surface is oxidized by an alternative means. Again, these tests utilized XPS, as described in the above examples, to examine the surface chemistry of the films after modification. In particular, an ammonia-containing gas was selected in this example for oxidation of the hydrogen-plasma modified fluoroxerogel of Example 2, in which the initial plasma was hydrogen at 200 watts and 300 watts for ten minutes at 0.5 torr. The results of the second plasma treatment is summarized in Table 12 and 13 below. The low resolution survey spectra of these specimens contained carbon, oxygen, nitrogen, fluorine and silicon. The atomic concentrations of oxygen (8%-16% after) and nitrogen (0.5%-11% after) was found to increase after treatment at 100 watt at 0.5 torr for a period of five minutes. This gave this material a water wettability of seven degrees following the oxidation.

TABLE 12

(at 45° at 300 W)

| Trial | Fluorine | Oxygen | Carbon | Silicon | CHx |
|---|---|---|---|---|---|
| 20 | 8.54 | 6.79 | 0.80 | 81.82 | 2.06 |
| 21 | 6.74 | 6.89 | 0.00 | 85.08 | 1.28 |
| 22 | 7.50 | 6.07 | 0.67 | 84.67 | 1.10 |
| 23 | 8.06 | 7.03 | 0.48 | 82.56 | 1.88 |
| 24 | 7.67 | 6.57 | 0.11 | 84.60 | 1.05 |
| Average | 7.7 | 6.7 | 0.4 | 83.7 | 1.5 |
| STDEV | 0.7 | 0.4 | 0.3 | 1.5 | 0.5 |

TABLE 13

(at 45° at 200 W)

| Trial | Fluorine | Oxygen | Carbon | Silicon | CHx |
|---|---|---|---|---|---|
| 25 | 9.61 | 15.41 | 10.17 | 61.56 | 3.26 |
| 26 | 9.29 | 13.35 | 11.74 | 62.97 | 2.66 |
| 27 | 8.90 | 14.25 | 10.05 | 63.62 | 3.18 |

TABLE 13-continued (at 45° at 200 W)

| Trial | Fluorine | Oxygen | Carbon | Silicon | CHx |
|---|---|---|---|---|---|
| 28 | 9.93 | 12.84 | 11.90 | 63.19 | 2.15 |
| Average | 9.4 | 14.0 | 10.1 | 62.8 | 2.8 |
| STDEV | 0.4 | 1.1 | 0.9 | 0.9 | 0.5 |

EXAMPLE 4

The example illustrates the plasma treatment of another fluorinated contact-lens material according to the present invention, in this case a high-Dk fluoropolymeric lenses. The lenses were made from molded rods of a material obtained from Random Technologies (San Franciso, Calif.), which consisted of Teflon AF 1600, comprising 65 mole percent PDD and 45 mole percent TFE, supplied by DuPont. The rods' dimensions were 12.7 mm diameter and 4 mm thick. Buttons were cut from the rods and lathed into contact lenses by techniques well known in the art. The resulting contact lenses were plasma treated as follows: The lenses were placed concave side up on an aluminum coated tray and the tray placed into a plasma treatment chamber. The plasma treatment chamber was a direct current DC RFGD chamber manufactured by Branson GaSonics Division (Model 7104). This chamber was a cold equilibrium planar configuration which had a maximum power of 500 watts. All lenses were prepumped to 0.01 Torr prior to any plasma treatment from residual air in the chamber. This process reduced the relative treatment level of the polymer by controlling gas pressure. The lens was first treated by passing hydrogen gas at 400 sccm into the chamber. The lenses were plasma treated for a period of 10 minutes (300 watts, 0.3 Torr). Subsequently, the lenses were treated by passing air at 400 sccm into the chamber while plasma treating the lenses for a period of 5 minutes (100 watts, 0.3 Torr). The contact angle of the lens with water (HPLC grade $H_2O$, 72.4 dynes/cm) was, before the plasma treatment, 115 degrees and, after the plasma treatment, was 0 degrees Many other modifications and variations of the present invention are possible in light of the teachings herein. It is therefore understood that, within the scope of the claims, the present invention can be practiced other than as herein specifically described.

The invention claimed is:

1. A fluorinated contact lens containing a fluorinated bulk material and a surface coating which, when the lens is in the unhydrated state, has a surface coating characterized by an oxygen content within a depth of about 74 ångstroms that is at least 2 mole percent enriched relative to the bulk material, based on XPS analysis.

* * * * *